Figure 1B:
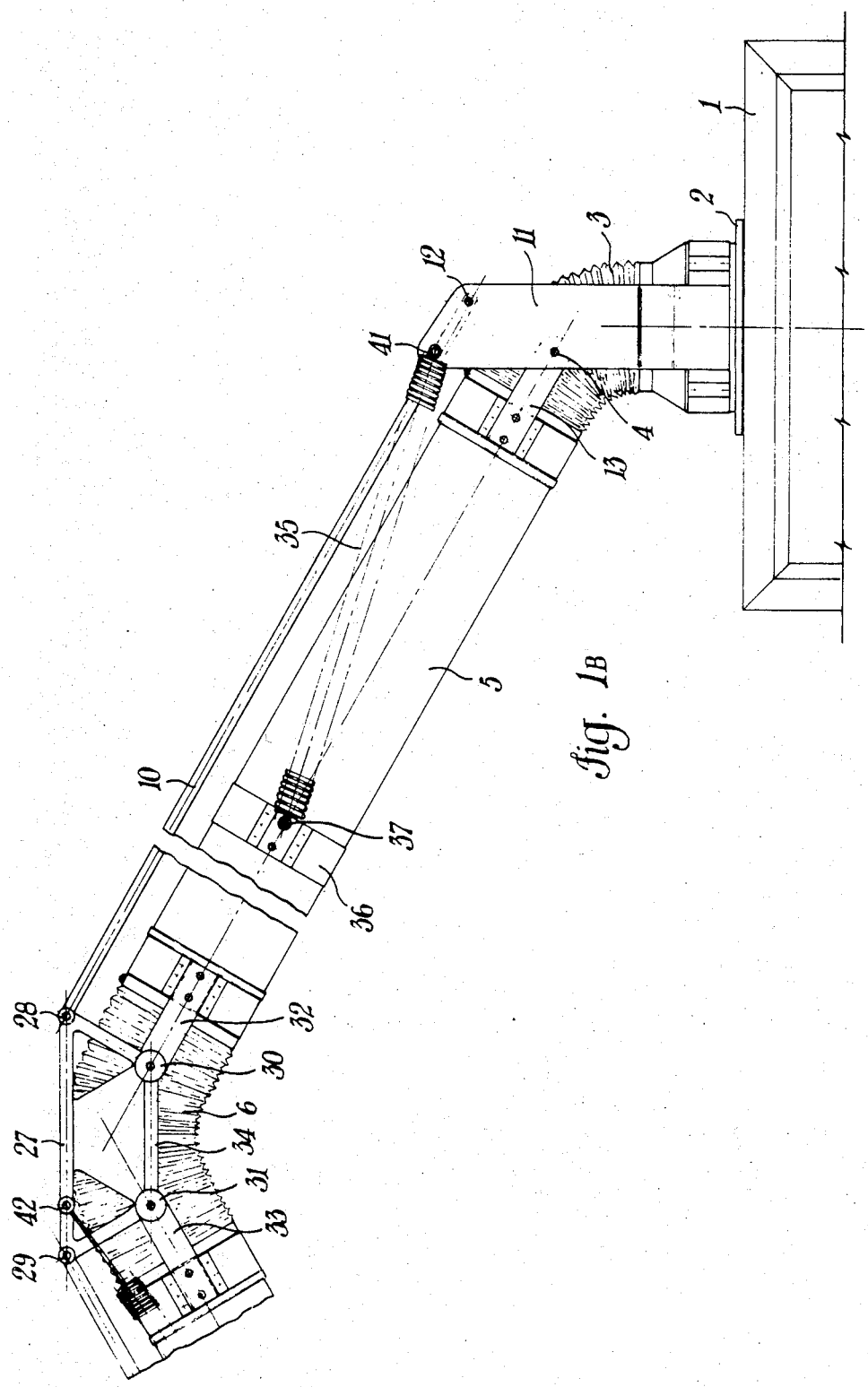

United States Patent [19]

Bellieni

[11] Patent Number: 4,699,046
[45] Date of Patent: Oct. 13, 1987

[54] ADJUSTABLE SUPPORT FOR SMOKE- OR FUME-EXHAUSTERS AND THE LIKE

[75] Inventor: Lucio Bellieni, Rome, Italy
[73] Assignee: Airbox S.r.l, Rome, Italy
[21] Appl. No.: 825,322
[22] Filed: Feb. 3, 1986
[30] Foreign Application Priority Data Feb. 6, 1985 [IT] Italy .................. 47643 A/85

[51] Int. Cl.⁴ .................................. B05B 15/00
[52] U.S. Cl. .................. 98/115.4; 248/281.1; 285/184
[58] Field of Search ............... 98/115.4; 248/280.1, 248/281.1; 285/184

[56] References Cited

U.S. PATENT DOCUMENTS 1,075,541 10/1913 Browne .................. 248/281.1
4,213,591 7/1980 Jaakkola .................. 248/281.1
4,446,861 5/1984 Tada .................. 98/115.3 X

FOREIGN PATENT DOCUMENTS 1506886 4/1978 United Kingdom ............... 98/115.4

Primary Examiner—Harold Joyce
Attorney, Agent, or Firm—Samuels, Gauthier, Stevens & Kehoe

[57] ABSTRACT

An adjustable support for smoke- or fume-exhausters and the like, said support comprising a first and a second parallelogram, each parallelogram being made up of two upper rods and a rigid suction tube, two compensating spring pairs which are respectively associated to one of said parallelograms, lengths of a flexible hose between the first parallelogram and said exhauster, as well as between said first and second parallelograms and between the second parallelogram and the suction hood, the coupling between said first and second parallelograms being realized through transmission plates with four points having a lower arm of a length longer than the diameter of said suction tube.

6 Claims, 4 Drawing Figures

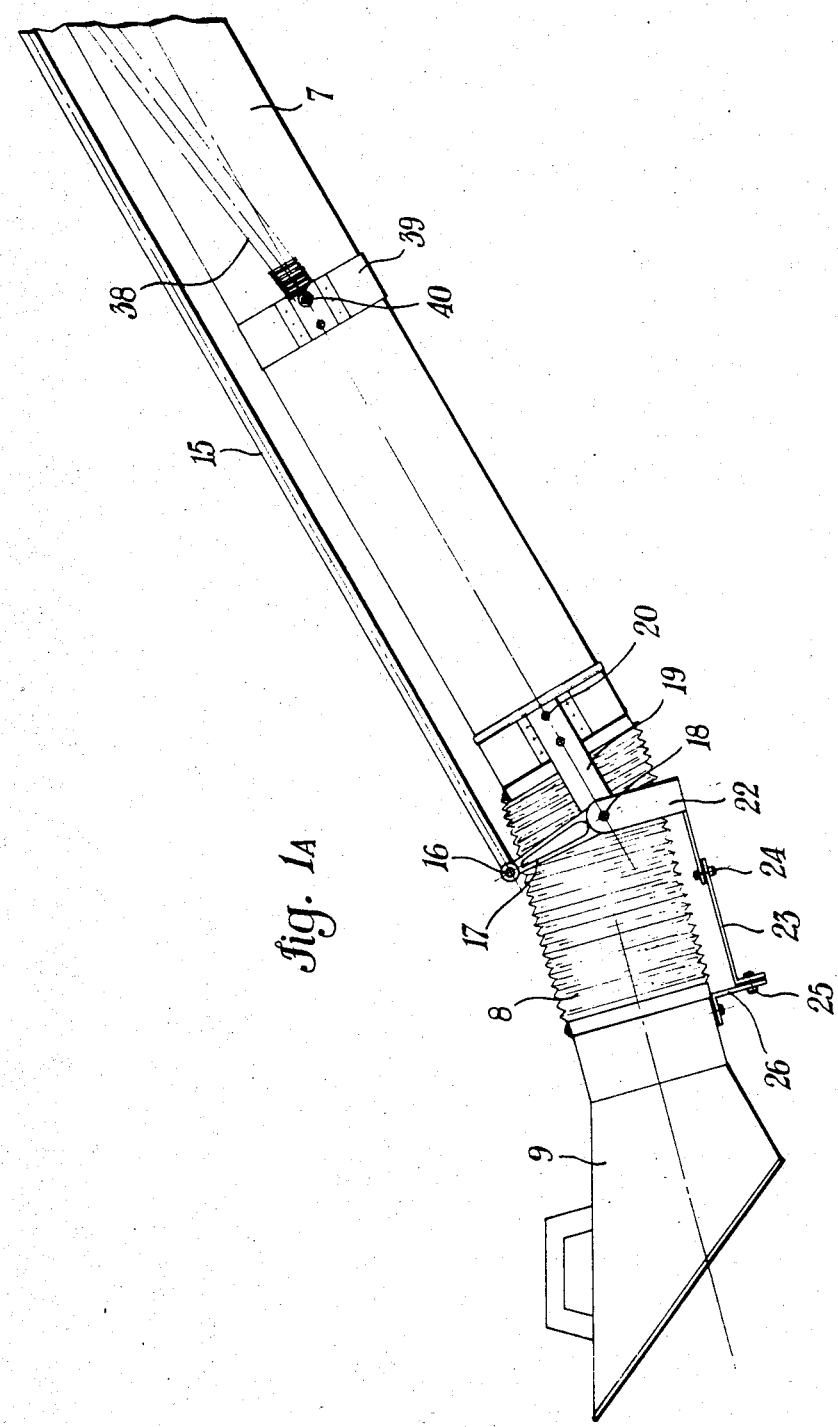

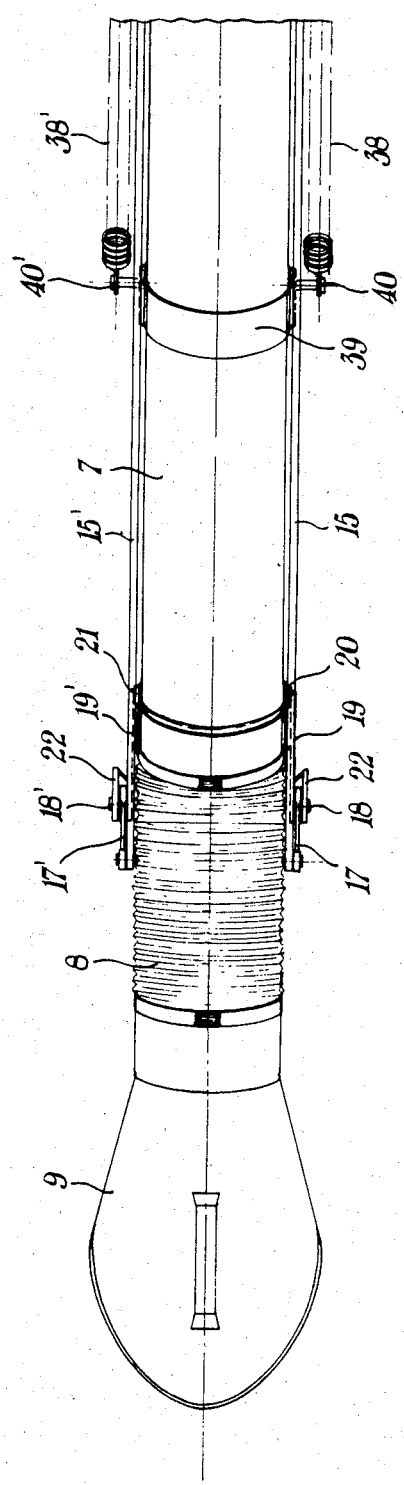

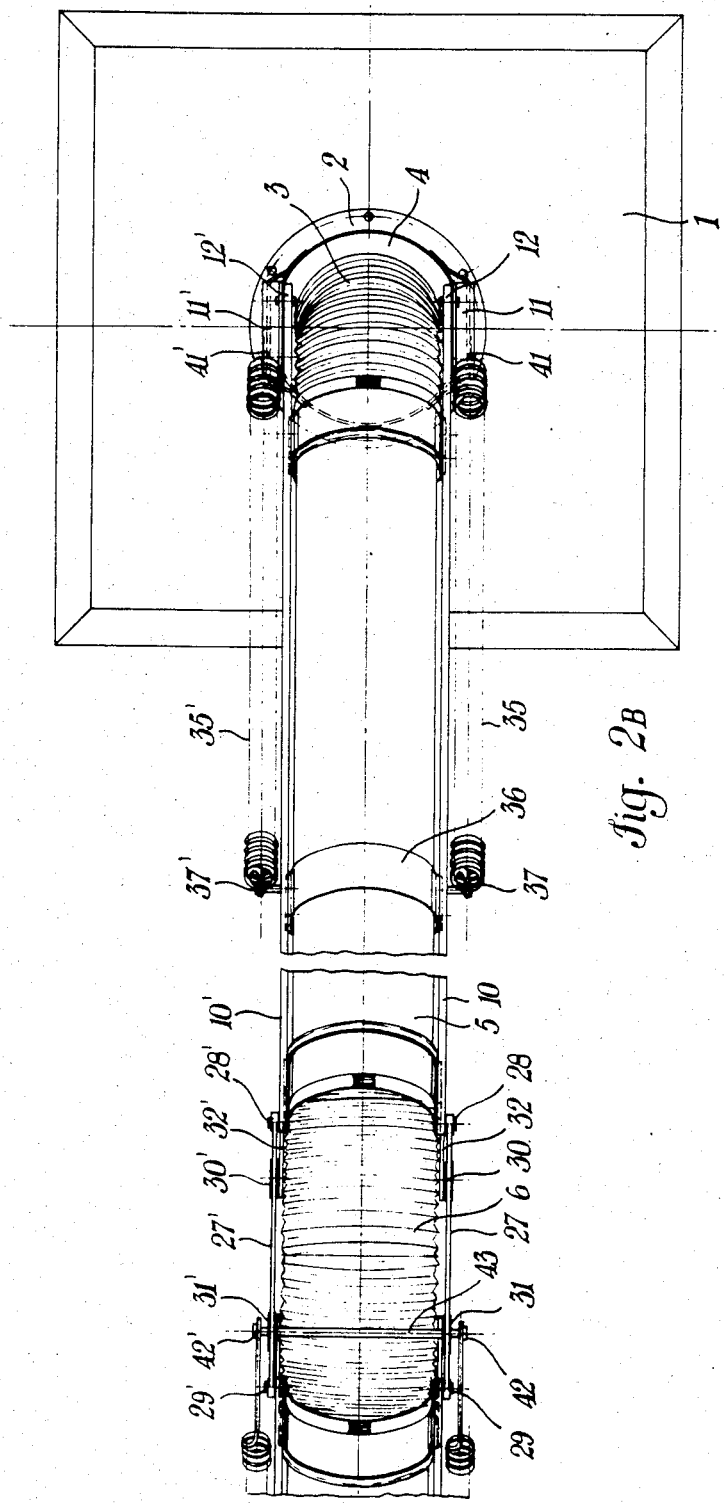

ADJUSTABLE SUPPORT FOR SMOKE- OR FUME-EXHAUSTERS AND THE LIKE

The present invention relates to an adjustable support for a smoke- or fume-exhauster and the like. More particularly, this invention relates to a support of said type having structural and functional properties such as to assure a very high flexibility of employment. Moreover, the support according to the present invention, in addition to be made of a modular structure, gives the possibility of keeping the orientation of the suction hood in the desired position, even in the case of moving the suction arm and shifting the same in any direction and through any angle.

Smoke- or fume-exhausters and the like are increasingly employed at the present time in the industrial field.

There are many devices commercially available for serving the purposes pointed out above, but it is to be observed that such devices involve a number of drawbacks which make their use troublesome in some cases, and which anyone quite often make their use inconvenient.

For instance, the device disclosed in the Italian Pat. No. 967309 (Bill Nederman) provides a supporting structure inside the flexible suction tube, said structure being centrally articulated, as well as articulated at the connection point with the suction box. It is well evident that a structure provided inside the suction tube gives rise to a number of problems and drawbacks because of the fact that the material so sucked comes in contact with the supporting structure and deposits on the same, so as to compromise possibly the good performance of the device, and in addition because the load losses which occur, so that it is necessary to oversize the suction system.

On the contrary, the device that is the object of the Italian Pat. No. 1058789 in the name of Coral S.a.s., provides a structure made up of two (or more) rigid tube members which are articulated at their connections and whose actions counteracting the friction forces at the connection points are obtained, for the first arm, through a large spring fastened to the connection end of the exhauster and to the articulation point, whereas no such action is provided for the next arms, so that the structure is quite heavy and hard to move. Said device does not allow to keep the orientation of the suction hood unaltered when the position of the arm is changed.

The adjustable support according to the present invention aims at obviating these and other drawbacks by providing a device which consists of a modular structure comprising two or more articulated parallelograms, whose lower arm is the same suction tube, said parallelograms being articulated centrally by means of a four points transmission plate which allows said parallelogram to close completely so that the articulating capacity of the support is increased.

The supporting action is obtained in the support according to the present invention through springs, the frictions provided at the various hinge points having the function of compensating the spring actions.

Moreover, the support according to the present invention allows the orientation of the suction hood to be kept unaltered also when the arm is moved.

A further object of the present invention is that of supplying a double-friction articulation system of the suction hood, so that the orientation of such system keeps unaltered unless said hood is directly acted upon.

Thus, it is a specific object of the present invention that of supplying an adjustable support for smoke- or fume-exhausters and the like, said support being characterized in that it comprises parallelogram means, each parallelogram being made up of rod means and a rigid suction tube, pairs of compensating springs which are associated respectively to one of said parallelograms, lengths of flexible hose upstream the first parallelogram, between the two adjacent parallelograms and between the last parallelogram and the suction hood, the coupling between said adjacent parallelograms being realized by means of four points transmission plates having a lower arm of a length longer than the diameter of said suction tube.

According to a particularly preferred embodiment of the present invention, the parallelograms of said support are each made up of two upper rods and of a rigid suction tube, which latter performs the functions of the lower rod.

According to a further particularly preferred embodiment of the support according to the present invention, the compensating springs associated to each of said parallelograms are fastened at the upper part to a point on the vertical line of the lower hinge point of the parallelogram so as to avoid the presence of a residual angle which, in the position of maximum extension of the spring, would alter the equilibrium state of the whole system.

Again according to the present invention, two inverted U-shaped sections or inverted "channels" can be provided which are lateraly fastened to said rigid tube through bolts, which give a higher stiffness to the structure so consisting of the same together with said rigid tube one end of said compensating spring pairs being centrally coupled to said U-shaped sections, and the respective articulation points being hinged at the two ends.

Again according to the present invention, advantageously a double-friction system is provided at the end of the parallelogram where the suction hood is coupled at the articulation point of said upper rods, of said rigid tube as well as of said suction hood, said friction system experiencing between the upper rod and the rigid pipe a friction lower than the friction occurring between the rigid pipe and the articulation point of said hood, so that motions given to the two parallelograms as a whole do not give rise to motions of said hood.

More particularly, an angle section or L-shaped rod can be provided which is hinged at the upper part with an upper rod of said parallelogram, at the center position, on the connection system between the rigid pipe, the length of the flexible hose between the rigid tube and the hood, and, at the lower part, on an articulation plate of the hood itself, the friction system of lower friction action being provided at said central hinge, the friction system of higher friction action being provied at said lower hinge, and a similar system being provided between the other upper rod of the parallelogram and the articulation point of said hood.

Thus, once the desired position of the hood has been set manually, the suction arm can be acted upon as desired without changing the angular orientation of the hood.

Further according to the present inventin, a rod is provided between said four point transmission plates, which rod is transversal and fastened at the connection point of said compensating springs associated to the parallelogram, such rod transmitting in that way a fraction of the present stress.

According to a further embodiment of the support of the present invention, two such parallelograms are provided, in series.

The present invention is disclosed in the following for illustrative and not for limitative purposes, with particular reference to a preferred embodiment of the same which is illustrated in the enclosed drawings, wherein:

FIGS. 1A and 1B show a side view of the support according to the present invention; and FIGS. 2A and 2B show a plan view of the support of FIGS. 1A and 1B.

With reference now to the enclosed drawings, it can be observed that an exhauster 1 of the known type bears at the upper part a revolving or rotating connection member 2 to which the suction tube is attached through a length of a flexible hose 3 ending with a bush 4. The suction tube in addition is made up of a first rigid tube 5, a second length of a flexible hose 6, a second rigid tube 7 and a third length of a flexible hose 8. At the end of the hose 8 the small suction hood 9 is provided.

The rigid tube 5, together with the two upper rods 10 and 10', constitutes the first parallelogram which, at its lower end is fastened to two plates 11, 11'. Such fastening is of a direct type at the point 12 and 12' as regards the upper rods 10 and 10', whereas the fastening action occurs through the interposition of a plate 13 as regards the tube 5. Friction members are provided at points 12, 12' and 14, 14' where hinges are placed, said friction members being interposed between the single members hinged at said points and movable with respect to each other.

The second parallelogram, similarly to the first one, is made up of the rigid tube 7 and of two upper rods 15 and 15'. Said rods 15, 15' are hinged at 16 and 16', two plates 17 and 17', hinged at 18, 18', beginning at said points 16, 16'. Moreover, two plates 19 and 19' rigidly connected to the rigid tube 7 at points indicated with references 20 and 21 are hinged at the points 18, 18'.

A shaped plate 22 is also hinged at the points 18, 18', which plate is connected to the small suction hood 9 through the rod 23 which is articulate at point 24, the articulated joint 25 and the L-shaped rod 26, so as to control the motions of said hood.

As a consequence, a double friction system is provided at the articulation joint 18, 18' so as to cause the motions of the articulated parallelograms assembly to be independent of the motions of the small suction hoods. Thus, once the position of the small hood 9 has been fixed, all sequential motions of the suction tube will not change the inclination of said hood, because of the characteristics of said articulated parallelogram. To that aim, friction systems will be provided between the plates 17, 19 and 17', 19', which systems exert a friction force lower than those provided between the plates 17, 17' and 22. The orientation of the small hood 9 will be fixed manually and independently of the motions of the suction tube, that is, independently of the rotation about points indicated with references 18, 18' as regards the vertical motions, about point 24 as regards the horizontal motions, and about point 25 as regards rotary motions.

Two L-shaped rods being fastened at the upper parts to the rods 15 and 15', centrally with respect to the coupling collar between the tube 7 and the flexible hose 8, or to the analogous coupling system, and at the lower parts to the plate 22.

The friction system with higher friction force will be arranged at the lower hinge point, whereas the sysem will lower friction value will be arranged at the central hinge point.

Two transmission plates 27, 27' with four points are provided at the point of the central articulation joint between the two parallelogram systems. Said four points transmission plates 27, 27' allow the parallelogram assembly to close completely.

The rods 10, 10' are hinged at points indicated with references 28, 28', whereas the rods 15, 15' are hinged at points 29, 29'. The two rigid pipes 5 and 7 are hinged in their turn at the points 30, 30' and 31, 31' through two pairs of plates 32, 32' and 33, 33' which are rigidly connected to the same.

In order to mate the whole parallelogram assembly close completely, it is necessary to respect a constraint in the structure to be realized, said contraint deriving from the fact the arm 34 of the plate 27, and in a similar way the arm 34' of the plate 27', has to be longer than the diameter of the suction pipe.

A first pair of compensating springs 35, 35' is provided between the plates 11, 11' and a central collar 36 on the tube 5, on which said springs are fastened at the points 37 and 37'. A second pair of springs 38, 38' in provided between the central collar 39 on the pipe 7, on which the transmission plates 27, 27' are fastened at the points 40, 40'.

It can be observed that the springs 35, 35' are fastened to the plates 11, 11' at points 41, 41' on the vertical through the hinge points 14, 14', and in the same way the springs 38, 38' are fastened to said transmission plates at points 42, 42' and not at the hinge points 29, 29'.

The arrangement of the coupling point of said springs 38 and 38' outside the friction system point is suggested by the fact that in such a way the return force caused by the residual angular displacement present is avoided, which force would not allow to keep the equilibrium state under maximum extension conditions of the spring.

A structure of the kind disclosed above, in which the parallelogram properties are exploited, also allows to obtain a constant deflection of the spring because a progressive compensation caused by the reduction of the angular displacement corresponds to an increased extension of the springs.

Moreover, a rod 43 is provided between the two transmission plates 27 and 27', more exactly between the two coupling points 42 and 42' of the springs 38, 38', which rod, by acting as a strut, transmits a fraction of the stress.

The present invention has been disclosed with particular reference to some specific embodiments of the same for illustrative and not for limitative purposes, and it is to be understood that modifications and changes can be introduced in the same by those who are skilled in the art without departing from the object and scope of the invention for which a priority right is claimed.

What is claimed is:

1. An adjustable support for connecting a movable intake hood to an exhauster for smoke, fumes or the like, said support comprising:

rigid first and second suction tubes, each having intake and discharge ends;

flexible conduit sections extending between said exhauster and the discharge end of said first suction tube, between the intake end of said first suction tube and the discharge end of said second suction tube, and between the intake end of said second suction tube and said intake hood, said flexible conduit sections and said first and second suction tubes providing a continuous exhaust passage beteen said intake hood and said exhauster;

first linkage means for pivotally connecting the discharge end of said first suction tube to said exhauster;

intermediate linkage means for mechanically coupling said second suction tube to said first suction tube, said intermediate linkage means being interposed between and being pivotally connected to the intake end of said first suction tube and to the discharge end of said second suction tube, the distance between the pivotal connections of said first and second suction tubes to said intermediate linkage means being greater than the diameter of said first and second suction tubes;

third linkage means pivotally connected to the intake end of said second suction tube; and first and second rod members respectively arranged exteriorly of and parallel to said first and second suction tubes, the opposite ends of said first rod members being pivotally connected respectively to said first and intermediate linkage means, and the opposite ends of said second rod members being pivotally connected respectively to said intermediate and third linkage means.

2. An adjustable support in accordance with claim 1 wherein said first suction tube and said first rod members define opposite sides of a first parallelogram having its remaining sides defined by said first and intermedite linkage means, and wherein said second suction tube and said second rod members define opposite sides of a second parallelogram having its remaining sides defined by said intermediate and third linkage means.

3. An adjustable support in accordance with claim 2 further comprising first and second tension springs extending respectively between said first linkage means and said first suction tube, and between said intermediate linkage means and said second suction tube.

4. An adjustable support in accordance with claim 1 further comprising fourth linkage means for mechanically coupling said intake hood to the intake end of said second conduit for pivotal movement about an axis coincident with that of said third linkage means.

5. An adjustable support in accordance with claim 4 wherein said fourth linkage means includes a first bracket pivotally connected to the intake end of said second conduit, a second bracket secured to said intake hood, and means for interconnecting said first and second brackets for pivotal movement about an axis perpendicular to said coincident pivotal axis.

6. An adjustable support in accordance with claim 2 wherein the sides of said parallelogram defined by said suction tubes are reinforced by channel members extending along the lengths of and secured externally to said suction tubes.

* * * * *